2,898,293
WAX SIZED PAPER

Robert G. Capell, Pittsburgh, and Philip R. Templin, Oakmont, Pa., assignors to Gulf Research & Development Company, Pittsburgh, Pa., a corporation of Delaware No Drawing. Application December 28, 1953
Serial No. 400,761

6 Claims. (Cl. 210—502)

This invention relates to the manufacture of wax impregnated paper having improved strength characteristics and adaptability to special uses.

It has long been advantageous in the preparation of papers for certain purposes to incorporate, as a sizing agent in the paper, waxes of various types. The wax contributes water resistance, softness, and flexibility and can be incorporated in the paper by the Beater process in which the wax size is added to the pulp furnish before the paper is formed. Both natural and mineral waxes can be used, and of the latter both paraffin and microcrystalline waxes are suitable. Microcrystalline waxes are especially useful where the adhesive properties of this wax are desirable, as in laminated papers. Waxy hydrocarbon polymers are also used in paper sizing, particularly in blends with other waxes.

The incorporation of wax in paper as a beater- or engine-size has the disadvantage of reducing the physical strength of the paper as measured by the burst strength, tear strength and tensile strength. In one case in which paper was sized with about 2 percent, by weight of the paper, of an emulsion consisting essentially of about 15 percent, by weight, of a paraffin wax, the burst strength was reduced about 30 percent, the tear strength about 25 percent and the tensile strength about 20 percent.

Briefly stated our invention comprises the process of, and the product obtained by adding to a wax emulsion that is employed for sizing a magnesium-silicate gel within the range of proportions of 0.25 to 5.0 percent of the total weight of the wax-sized paper; the weakening effects of wax sizing are thereby to a very substantial extent overcome and the burst, tear and tensile strength of wax-sized paper increased. The degree of improvement for a given amount of gel varies with the paper that is treated and the amount of wax that is used. In some instances the addition of magnesium-silicate gel has improved the strength of wax-sized paper to substantially the value exhibited by the untreated paper and occasionally the strength of untreated paper has been increased by the wax-gel sizing.

Our invention comprehends the use of between about 1.0 to 5.0 percent, based on the weight of sized paper, of wax or wax blend as engine-sizing in combination with the magnesium-silicate gel. The wax can be a natural wax, paraffin or microcrystalline wax or a synthetic hydrocarbon polymer such for example as a polyethylene or polyisobutylene. The wax blends comprise mixtures of the said waxes. An example of a wax blend lending improved qualities to waxed paper is paraffin plus 5 percent of a polyethylene having a molecular weight within the range of about 1,000 to 30,000.

The magnesium-silicate gel (also termed silica-magnesia gel) can be prepared, for example, by the following method. An aqueous solution of a silicate is continuously added to an agitated solution of a magnesium compound and magnesium-silicate gel is precipitated and filtered. The magnesium-silicate gel is not dried prior to use in paper sizing. The gel may be filtered out of suspension, washed, and reslurried, but, while still in the hydrated, gelatinous state and in slurried or filter cake form, it is blended with the wax emulsion and then added to the beater. Once the magnesium silicate has been dried out in the finished paper, it will not swell or rehydrate on contact with water. Magnesium-silicate gel does not swell after having been thoroughly wetted, allowed to swell and then dried (it is dried as a component of the sized paper). Paper containing the wax-gel composition is thus especially suitable for use in the presence of liquids. This property of the gel contributes importantly to the employment of the composition of our invention as filter paper.

A feature of our invention is the provision of a novel adsorbent filter paper that is resistant to deterioration in the presence of aqueous solutions and is capable of removing not only the larger particles from aqueous liquid media by filtration but also finer non-filterable particles and dissolved substances by adsorption. The wax sizing, being restricted in total amount to at most 5 percent by weight of the paper, does not render the paper so impervious as to prevent its use for filtering but it nevertheless reduces the swelling, sponging or other deterioration. Magnesium silicate gel is also substantially stable in the paper composition in the presence of liquids since it does not reversibly swell and contract. Magnesium-silicate gel is known to be an efficient adsorptive agent. The magnesium-silicate gel particles are available for the removal by adsorption of fine particles and dissolved substances from liquid media because the gel is separately prepared, before being added to the wax emulsion, and thus forms discrete particles in the paper composition.

The wax-gel composition of our invention is prepared by first forming an aqueous emulsion of a wax usually by adding water to a commercial emulsifiable wax mixture. The magnesium silicate which is prepared separately and is usually added to the emulsion in dispersion in water is then stirred and thoroughly mixed with the aqueous wax emulsion. The gel content of the solids of the so-formed mixture will be from about 5 to 60 weight percent.

The mixture of gel and wax emulsion is added to wet furnish during, or subsequent to, the beater operation that is employed in paper manufacture.

In forming the paper sheets used in comparative examples reported herein, a wet beater pulp was adjusted to a 3 percent concentration by weight of dry bleached sulfite wood pulp and sufficient alum was added to the solution to give a pH of 5.5 to 5.7. The mixture was stirred vigorously for about two hours at a temperature of 27° C. The slurried mixture was diluted to 16 liters and 5 cubic centimeters of a 5 percent solution of sodium aluminate were added thereto. The pH of this solution was determined and sufficient alum was added to bring the pH back to 5.5 to 5.65.

A sheet machine was filled to screen level with fresh water, and a deckle, which was then fastened in place, was also filled with fresh water. Sufficient furnish was added to the fresh water (950 ml.) to provide a sheet of test paper about 0.007 of an inch thick. The paper sheet was pressed from the diluted furnish and these steps were repeated until four sheets had been made and discarded. A fifth sheet was then formed in the sheet mold which was filled with white water from the previous sheet-making runs. The screen was removed from the sheet mold and the sheet was covered with a felt cloth. The cloth was covered with a metal plate and pressed at a pressure of 30 pounds per square inch for about 15 seconds. Four sheets were made by the foregoing method and were dried by blotting and by placing in a steam drier for 3 minutes at a steam pressure of 20 pounds per square inch.

The dried sheets were thereafter tested by standard methods of the Technical Association of the Pulp and Paper Industry for burst (T-403m-47), tear (T-414m-49) and tensile (T-404m-50) strength.

In the following examples, the results of which are set forth in the following table, a bleached sulfite paper prepared by the foregoing method and sized with a combination of wax and magnesium-silicate gel was prepared and compared with wax-free paper and wax sized paper containing no gel. Two aqueous wax emulsions having the compositions indicated in the table were made. A magnesium-silicate gel was prepared by adding 150 cubic centimeters of an aqueous solution containing about 70 percent by weight of a sodium silicate to a solution containing 50 grams of magnesium sulfate in a liter of distilled water according to the method described in U.S. Patent 2,393,625 of FitzSimons. The magnesium-silicate gel was water washed and then added to one of the aqueous wax emulsions in amounts such that the gel constituted in one case about 42 percent by weight of the total solids of the mixture and in another case 25 percent by weight of the total solids.

In the preparation of paper sheets containing the wax-gel size, the paper was prepared as above described and during its preparation the wax emulsion containing magnesium-silicate gel was added to the furnish just subsequent to the beater operation. About 50 cubic centimeters of the wax-gel mixture were added and the resultant paper sheets contained about 1.9 percent of wax gel size by weight of the dry paper sheet. The following table illustrates the results obtained:

*Beater sizing of paper with wax and magnesium-silicate-gel*

| Size | Paper; no sizing | Wax A [1] | Wax A and gel | Wax B [2] | Wax B and gel |
|---|---|---|---|---|---|
| Size Solids, Percent of Dry Sheet | 0.0 | 1.9 | 1.9 | 1.9 | 1.9 |
| Magnesia-Silica Gel, Percent of Size Solids | 0.0 | 0.0 | 42.0 | 0.0 | 25.0 |
| Sheet Thickness, Inches | 0.007 | 0.007 | 0.007 | 0.007 | 0.007 |
| Burst Strength, p.s.i | 49 | 35 | 47 | 47 | 48 |
| Tear Strength, Grams | 300 | 240 | 300 | 280 | 300 |
| Tensile Strength kg. per ½ inch | 5.3 | 4.1 | 5.0 | 5.2 | 5.9 |

[1] Wax emulsion A has the following composition: Triethanolamine, 2.1 weight percent; paraffin wax, 15.4 weight percent; carnauba wax, 1.0 weight percent; stearic acid, 4.6 weight percent; water, 76.9 weight percent.
[2] Wax emulsion B has a composition similar to A and contains about 50 percent solids.

It is noted that the dry sheet without size or filler showed a burst strength of 49 pounds per square inch, tear strength of 300 grams and a tensile strength of 5.3 kilograms per ½ inch. The incorporation in the paper of wax emulsion A consisting essentially of about 15 weight percent of paraffin wax reduced the burst strength to 35 pounds per square inch, the tear strength to 240 grams and the tensile strength to 4.1 kilograms per ½ inch. In another case not shown in the table the addition of wax emulsion A in the same amount reduced the burst strength to 38.4 pounds per square inch, the tear strength to 221 grams and the tensile strength to 3.7 kilograms per ½ inch. When a wax emulsion plus a magnesium-silicate gel was used the burst strength was increased to 47 pounds per square inch, the tear strength to 300 grams and the tensile strength to 5 kilograms per ½ inch. When wax emulsion B was employed the burst strength was reduced to 47 pounds per square inch, the tear strength to 280 grams and the tensile strength to 5.2 kilograms per ½ inch. The addition of a magnesium-silicate gel to wax emulsion B increased the burst strength to 48 pounds per square inch, the tear strength to 300 grams and the tensile strength to 5.86 kilograms per ½ inch, the last figure indicating a substantial increase in tensile strength over that of the untreated paper.

The tests above reported and performed according to standard methods, as aforementioned, of the Technical Association of the Pulp and Paper Industry indicate improvements in burst strength of as high as 34 percent over that of wax-sized paper, an increase in tear strength of as high as 40 percent over that of wax-sized paper, and an increase in tensile strength of as high as 21 percent over that of wax-sized paper. Deviations and test results are reported by the Technical Association in their Standard test publications to be five percent for burst (T-403M-47), seven percent for tear (T-414M-49), and five percent for tensile strength (T-404M-50), thus indicating that the above results show substantial significant improvement.

The non-swelling and adsorptive characteristics of the discrete particles of magnesium-silicate gel distributed in paper or like fibrous bodies contribute marked utility to our novel method of filtering and separating finely divided and dissolved substances from fluid mediums, in which method the said fluid medium is passed through the fibrous body. The said body will contain from 0.25 to 5.0 percent, by weight, of magnesium silicate gel and can contain from 1.0 to 5.0 percent of wax without substantial interference with the adsorptive function of the gel.

Having described our invention, we claim:

1. A wax-sized porous paper that contains from 0.25 to 5.0 percent by weight, based on the total weight of the wax-sized paper, of an adsorbent magnesium-silicate gel that is distributed throughout the wax.

2. A porous paper containing at least one wax size selected from the group consisting of natural wax, paraffin wax, microcrystalline wax and synthetic hydrocarbon polymers, and between 0.25 and 5.0 percent by weight, based on the total weight of the wax-sized paper, of an adsorbent magnesium-silicate gel that is distributed uniformly throughout the wax.

3. A paper composition consisting essentially of porous paper, between 1.0 and 5.0 percent, by weight based on the total weight of the composition, of at least one wax size selected from the group consisting of natural wax, paraffin wax, microcrystalline wax and synthetic hydrocarbon polymers, and between 0.25 and 5.0 percent by weight, based on the total weight of the composition, of an absorbent magnesium-silicate gel that is distributed throughout the wax.

4. A wax-sized porous paper having, distributed throughout the fibers of the paper, between about 1.0 and 5.0 percent, by weight of the sized paper, of a wax size selected from the group consisting of a natural wax, paraffin wax, microcrystalline wax and synthetic hydrocarbon polymers and between 0.25 and 5.0 percent, by weight of the sized paper, of an adsorbent magnesium-silicate gel distributed uniformly throughout the wax.

5. An adsorbent filter paper consisting essentially of a porous paper, between 1.0 and 5.0 percent by weight, based on the total weight of the paper, of at elast one wax, distributed on fibers of the said paper, that is selected from the group consisting of natural wax, paraffin wax, microcrystalline wax and synthetic hydrocarbon polymers, and between 0.25 and 5.0 percent by weight, based on the total weight of the paper, an adsorbent magnesium-silicate gel that is distributed throughout the wax in the paper composition.

6. A method of separating finely divided and dissolved particles from a fluid medium which method comprises flowing the said medium through a filtering adsorbent means consisting essentially of a porous fibrous body throughout which from 1.0 to 5.0 percent, based on the weight of said body, of a wax and from 0.25 to 5.0 percent, based on the weight of said body, of an adsorbent magnesium silicate gel are uniformly distributed.

References Cited in the file of this patent

UNITED STATES PATENTS

| | | | |
|---|---|---|---|
| 724,636 | Wendling | Apr. 7, 1903 |
| 1,894,959 | Manson | Jan. 24, 1933 |
| 2,059,464 | Kress | Nov. 3, 1936 |
| 2,183,590 | Rembert | Dec. 19, 1939 |
| 2,349,469 | Sloan | May 23, 1944 |
| 2,563,897 | Wilson et al. | Aug. 14, 1951 |
| 2,568,144 | Cremer et al. | Sept. 18, 1951 |
| 2,601,597 | Daniel | June 24, 1952 |

OTHER REFERENCES

Paper Testing, Part I, Strength Prop., 2d ed., 1949, Inst. of Pap. Chem., pp. 35, 55, 163, 165 and 166.